(12) United States Patent
Johnson et al.

(10) Patent No.: US 6,675,901 B2
(45) Date of Patent: Jan. 13, 2004

(54) USE OF HELICALLY WOUND TUBULAR STRUCTURE IN THE DOWNHOLE ENVIRONMENT

(75) Inventors: Craig D. Johnson, Montgomery, TX (US); Patrick W. Bixenman, Houston, TX (US); Thomas H. Zimmerman, Houston, TX (US)

(73) Assignee: Schlumberger Technology Corp., Sugar Land, TX (US)

( * ) Notice: Subject to any disclaimer, the term of this patent is extended or adjusted under 35 U.S.C. 154(b) by 0 days.

(21) Appl. No.: 09/870,190

(22) Filed: May 30, 2001

(65) Prior Publication Data

US 2001/0047871 A1 Dec. 6, 2001

Related U.S. Application Data

(60) Provisional application No. 60/208,623, filed on Jun. 1, 2000.

(51) Int. Cl.[7] .......................... E21B 19/16; E21B 43/08; F16L 11/16; F16L 11/211
(52) U.S. Cl. ..................... 166/380; 166/384; 166/231; 166/234; 138/129; 138/135
(58) Field of Search .................... 138/98, 99, 118.1, 138/122, 129, 135, 154, 121, 172, 174; 166/278, 276, 277, 207, 228, 231, 233, 234, 381, 384, 380

(56) References Cited

U.S. PATENT DOCUMENTS

| | | | |
|---|---|---|---|
| 2,143,072 A | 1/1939 | Johnson | |
| 3,028,915 A | 4/1962 | Jennings | |
| 3,111,991 A | 11/1963 | O'Neal | |
| 3,167,122 A | 1/1965 | Lang | |
| 3,179,168 A | 4/1965 | Vincent | |
| 3,209,835 A | 10/1965 | Bourne, Jr. et al. | |
| 3,364,993 A | 1/1968 | Skipper | |
| 3,369,426 A | 2/1968 | Matz, Jr. | |
| 3,687,169 A | * 8/1972 | Reynard | 138/134 |
| 3,707,170 A | * 12/1972 | Mazuir et al. | 138/154 |
| 4,209,043 A | 6/1980 | Menzel | |
| 4,308,082 A | 12/1981 | Menzel | |
| 4,337,564 A | 7/1982 | Menzel et al. | |
| 4,415,390 A | 11/1983 | Smith | |
| 4,435,460 A | 3/1984 | Menzel | |
| 4,438,643 A | 3/1984 | Menzel et al. | |
| 4,616,495 A | 10/1986 | Menzel | |
| 4,687,690 A | 8/1987 | Menzel | |
| 4,865,127 A | * 9/1989 | Koster | 166/277 |
| 4,913,758 A | * 4/1990 | Koster | 156/191 |
| 4,971,152 A | 11/1990 | Koster et al. | |
| 4,977,931 A | 12/1990 | Menzel | |
| 4,995,929 A | 2/1991 | Menzel | |
| 5,046,558 A | * 9/1991 | Koster | 166/243 |
| 5,074,943 A | 12/1991 | Menzel | |
| 5,101,863 A | 4/1992 | Fujii et al. | |
| 5,310,000 A | * 5/1994 | Arterbury et al. | 166/296 |
| 5,366,012 A | 11/1994 | Lohbeck | |
| 5,468,322 A | 11/1995 | Menzel | |
| 5,507,346 A | 4/1996 | Gano et al. | |
| 5,595,800 A | 1/1997 | Menzel | |
| 5,660,912 A | 8/1997 | Menzel | |
| 5,927,344 A | * 7/1999 | Nobileau | 138/114 |
| 6,016,845 A | * 1/2000 | Quigley et al. | 138/125 |
| 6,070,665 A | 6/2000 | Singleton et al. | |
| 6,109,306 A | * 8/2000 | Kleinert | 138/127 |
| 6,148,866 A | * 11/2000 | Quigley et al. | 138/125 |
| 6,250,385 B1 | 6/2001 | Montaron | |

FOREIGN PATENT DOCUMENTS

| | | |
|---|---|---|
| SU | 1712576 | 10/1987 |
| WO | WO 90/00698 | 1/1990 |
| WO | WO 98/34742 | 8/1998 |
| WO | WO 00/17564 | 3/2000 |

* cited by examiner

Primary Examiner—David Bagnell
Assistant Examiner—Jennifer H Gay
(74) Attorney, Agent, or Firm—Trop Pruner & Hu PC; Jeffrey E. Griffin; Brigitte Jeffery Echols (57) ABSTRACT

A system that is useable in a subterranean well includes a tubular structure that is formed from a spirally wound strip, and the tubular structure is provided downhole in the subterranean well.

52 Claims, 11 Drawing Sheets

USE OF HELICALLY WOUND TUBULAR STRUCTURE IN THE DOWNHOLE ENVIRONMENT

CROSS-REFERENCE TO RELATED APPLICATIONS

This application claims the benefit under 35 U.S.C. §119 to U.S. Provisional Patent Application Ser. No. 60/208,623, entitled, "USE OF HELICALLY WOUND TUBULAR STRUCTURE IN THE DOWNHOLE ENVIRONMENT," filed on Jun. 1, 2000.

BACKGROUND

The present invention generally relates to tools and equipment used in the downhole environment. More particularly, the present invention relates to using a helically wound tubular in the downhole environment.

A wellbore typically is lined with a casing string. The use of the casing string may present challenges related to its installation as well as challenges related to maintaining the integrity of the casing string. For example, regarding the installation of the casing string, sometimes the inner diameter of the wellbore varies along the length of the wellbore. Thus, the cross-sectional diameter of the casing string must also vary. As a result, the casing string may be formed from casing sections that have different cross-sectional diameters, a factor that may increase the difficulty and cost associated with installing the casing string.

Furthermore, in many instances, the casing string is installed as the wellbore is being created, as the success of the drilling operation depends on the stability of the wellbore during the time the drilling is being undertaken. However, the conventional techniques of installing the casing string do not permit easy installation of the casing string while the drilling operation is being conducted.

Casing strings may become damaged during their lifetimes. In order to prevent the leakage of fluids between the exterior and interior of the casing string, the damaged area is typically patched. However, many challenges are presented with respect to patching the casing string where damaged.

Thus, there is a continuing need for a technique and/or arrangement to address one or more of the problems that are stated above.

SUMMARY

In an embodiment of the invention, a system that is useable in a subterranean well includes a tubular structure that is formed from a spirally wound strip, and the tubular structure is provided downhole in the subterranean well.

The advantages of such a system, as well as other features will become apparent from the following figures, detailed description and claims.

DETAILED DESCRIPTION

Figure 1:
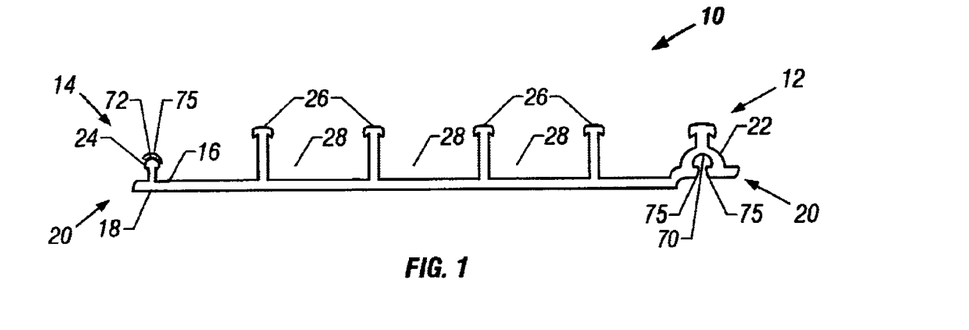
FIG. 1 is a cross-sectional view of an elongated strip taken along line 1—1 of FIG. 2.
Figure 2:
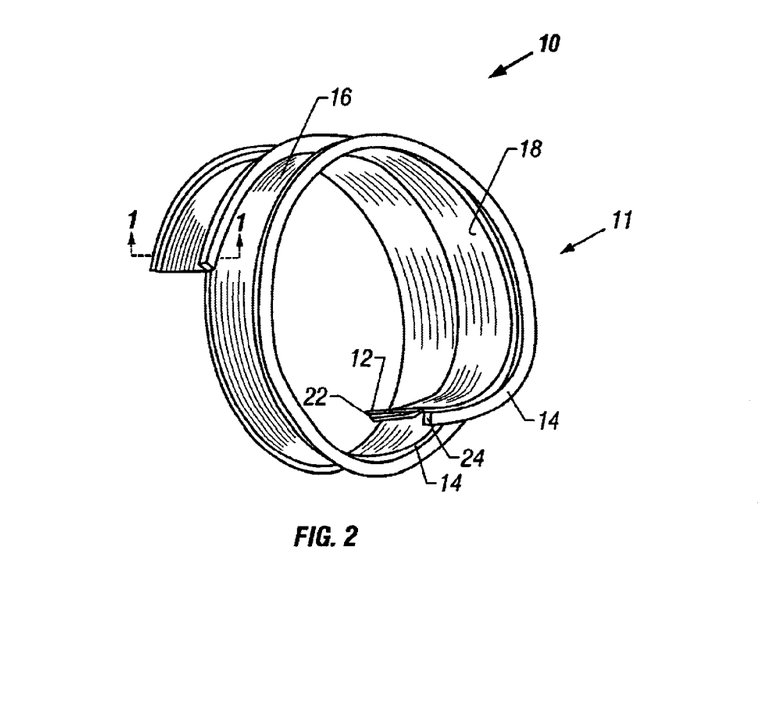
FIG. 2 is an isometric view of a portion of a tubular structure formed by the elongated strip.

Referring to FIGS. 1 and 2, an embodiment 10 of an elongated strip in accordance with the invention includes features that permit the elongated strip 10 to be spirally, or helically, wound so that the strip 10 mates with itself to form an elongated downhole tubular structure. As described below, the ability to form a downhole tubular structure out of the strip 10 permits the strip 10 to be deployed downhole in a form that occupies relatively little volume. Once deployed downhole, the strip 10 may be formed (as described below) into a tubular structure that is attached to a downhole structure to satisfy a particular downhole function. As examples, the downhole structure may be a production tubing, a casing, the well bore or another tubular structure, as further described below.

As an example, the strip 10 may be used to form a tubular structure such as a casing string. Because this casing string is formed and expanded in place downhole, the diameter of the casing string follows the diameter of the wellbore in which the casing string is installed. Thus, the diameter of the casing string formed in this manner may be decreased or increased along its length (and along a wellbore), thereby becoming an alternative to multiple size casing strings. In this manner, the casing string may be expanded against the wall of the wellbore to enhance wellbore stability. Alternatively, the tubular structure may be formed in a manner so that the diameter of the structure remains constant along a wellbore, thereby providing a monobore that eliminates today's restriction problems with telescoping casing strings.

In its role in lining the wellbore, the tubular structure may also be used to deploy downhole devices (sand control devices, for example) at specific locations. Furthermore, the tubular structure has the capability of carrying electrical and fluid communication lines that may be embedded in the tubular structure.

Besides forming a primary casing string, the tubular structure may also be used as a patch. In this manner, the tubular structure, has the capability of being expanded against the interior wall of an existing casing string to patch an opening in the casing string.

The tubular structure may also be used as a sand screen for filtering particulates from a well fluid flow. Other downhole applications of a tubular structure that is formed from the strip 10 will become apparent from the following description.

Turning now to the embodiment of the strip 10 that is depicted in FIGS. 1 and 2, the strip 10 has longitudinal edges with complementary mating profiles near each of these edges. The mating profiles, in turn, engage, or mate, with each other when the strip 10 is helically wound and the edges of adjacent windings slightly overlap each other. This helically winding thus produces a tubular structure.

More particularly, in some embodiments of the invention, the complementary mating profiles that are located near the longitudinal edges may be viewed as collectively forming an attachment mechanism that is indicated by reference numeral 20 in FIGS. 1 and 2. In some embodiments of the invention, strip 10 includes a first longitudinal edge 12, a second longitudinal edge 14, an outer surface 16, and an inner surface 18. Near first longitudinal edge 12 is a first mating portion 22 of the attachment mechanism 20, and near second longitudinal edge 14 is a second mating portion 24 of the attachment mechanism 20. In the helical tubular structure (FIG. 2), first 22 and second 24 mating portions 22 on adjacent windings mate thereby enabling the attachment function of attachment mechanism 20.

As an example, second mating portion 24 may include a ridge 72 that is profiled to be received into a corresponding channel 70 that of first mating portion 22. Other mating portions and other combinations of mating portions are possible and are within the scope of the appended claims.

Figure 11:
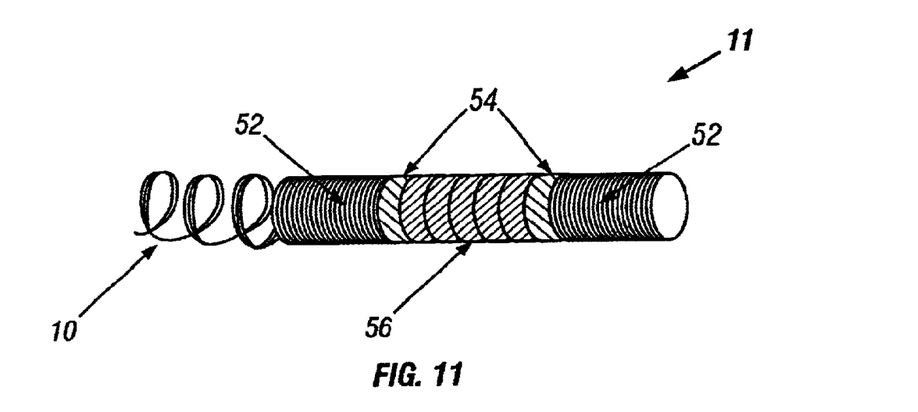
FIG. 11 is an isometric view of the tubular structure wherein the tubular structure is used as a well casing that provides zonal isolation of a formation.

As shown in FIG. 2, the elongated strip 10 may be helically wound to form a tubular structure 11. A more developed tubular structure 11 is depicted in FIG. 11 and is described in more detail below. As the strip 10 is wound, first 22 and second 24 mating portions of adjacent windings are pressed together so that the adjacent windings mate to form a tubular structure that grows in length as the winding progresses.

One or more elastomers may be attached to the strip 10 to seal off the central passageway of tubular structure 11 from the region outside of the tubular structure 11. For example, as depicted in FIG. 1, an elastomer strip 75 may, generally extend along longitudinal edge 14 on top of the ridge 72 to form a sealed connection between adjacent windings of tubular structure 11. In this manner, the elastomer strip 75 is energized to form this seal when the ridge 72 is inserted the channel 70. Thus, with the use of the elastomers as described, a fluid-tight tubular structure 11 may be formed. Other arrangements may be used to form a seal between adjacent windings of tubular structure 11.

Figure 12:
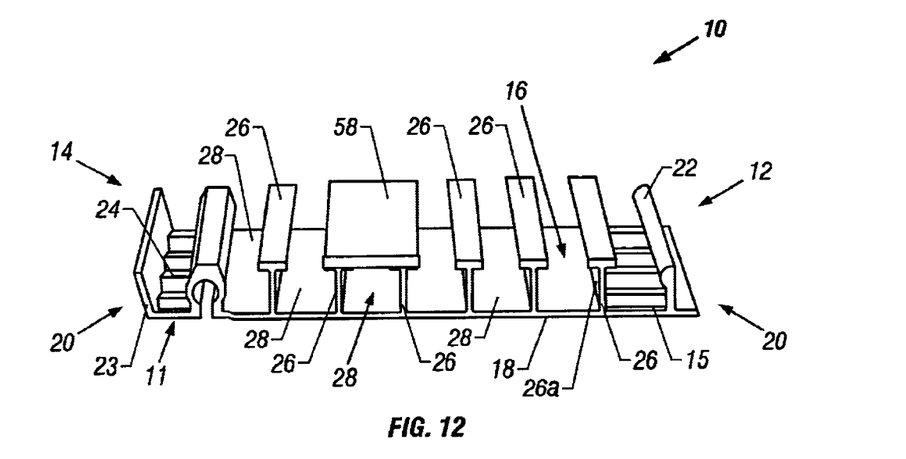
FIG. 12 is a perspective view of an elongated strip that includes a mechanism for providing fluid, electrical or fiber optic communication between two points along the length of the resulting tubular structure.

In some embodiments of the invention, strip 10 may be designed in such a way that once it is wound and interlocked, it is not possible to make the diameter of the tubular structure contract unless the mating profiles of strip 10 are pulled apart. As an example of such a design, the strip 10 that is depicted in FIG. 12 includes an L-shaped extension 11 that extends from second mating profile 23 toward longitudinal edge 14. The extension 11 is received by a channel 15 formed between the second mating profile 23 of the adjacent winding and a rib 26a of the strip 10, described below. The friction between extension 11 and channel 15 keeps adjacent windings from slipping with respect to each other to effectively interlock adjacent windings together to prevent the diameter of the tubular structure from changing.

For purposes of preventing the windings from being pulled apart, strip 10 may having mating profiles located near the longitudinal edges 12 and 14 to create a locking latch to prevent the tubular structure from being unwound. For example, as depicted in FIG. 1, the channel 70 of first mating portion 22 may include longitudinally extending tabs 75 that engage shoulders of ridge 72 to prevent second mating portion 24 from disengaging from first mating portion 22. It is noted that in the arrangement depicted in FIG. 1, adjacent windings may slide with respect to each other, and thus, the diameter of the tubular structure formed from the strip 10 in FIG. 1 may be expanded or contracted.

For use in downhole environments, the strip 10 can be deployed downhole in its linear form that occupies relatively little volume and can be formed into tubular structure 11 that occupies significantly more volume within the wellbore. A machine 100 (see FIG. 9) that is located in the downhole environment may be used to securely engage the first mating portion 22 and the second mating portion 24 of adjacent windings and to helically wind the strip 10 into the appropriate tubular shape. In the manner, the machine 100 includes a rotating head and guide rollers to form the spiral wrap and slightly overlap the longitudinal edges 12 and 14 so that first 22 and second 24 mating portions engage to lock adjacent windings together. The operation of the winding machine 100 is further described below.

Referring back to FIG. 1, in some embodiments of the invention, strip 10 includes a plurality of longitudinally extending ribs 26 that each extend outwardly from outer surface 16. The ribs 26 may be regularly spaced (for example) between longitudinal edge 12 and second longitudinal edge 14. Channels 28 are defined between adjacent ribs 26.

Strip 10 is constructed from materials that can withstand the severe conditions of the downhole environment. Appropriate materials include, but are not limited to, steel, stainless steel, polymers, glass fibers, and composites of the aforementioned materials.

Figure 3:
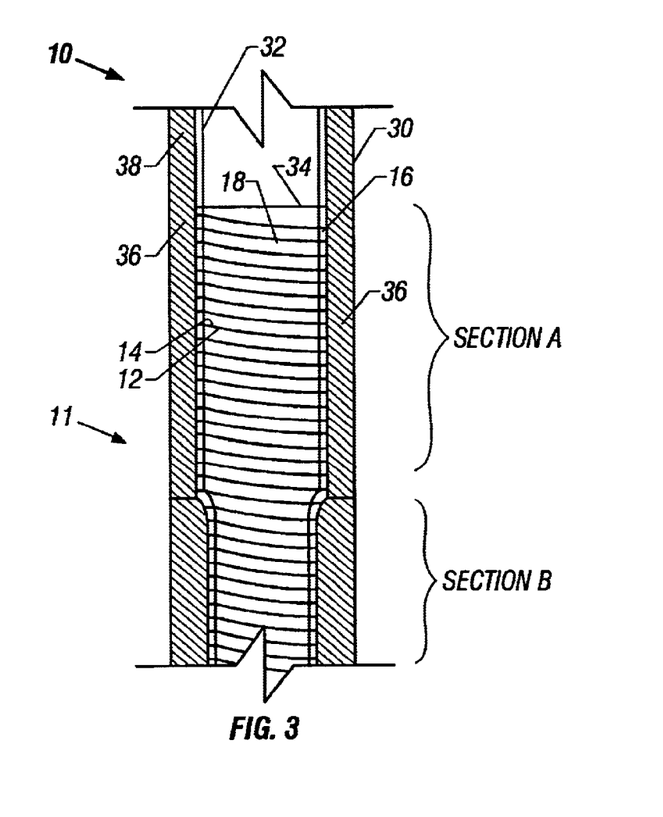
FIG. 3 is a schematic diagram of the tubular structure when used as a well casing with cement or resin deposited in the annulus of the wellbore.

One downhole use of strip 10 is illustrated in FIG. 3, which shows a wellbore 30 that includes a casing string 32. Casing string 32 has a lower end 34. In this embodiment, strip 10 is used as a continuation of or an alternative to the casing string 32. Strip 10 is attached to the lower end 34 of the casing string 32 by suitable means, such as a locking mechanism integral to the profile of the mating edges of the strip 10, and is wound to form the continuation of casing string 32. In the embodiment shown in FIG. 3, the internal diameter of the tubular structure 11 is substantially the same as that of the casing string 32. Also, in the embodiment shown in FIG. 3, cement or resin 36 can be circulated in the annulus 38 between the tubular structure 11 and the wellbore 30. The cement or resin 36 is useful to ensure hole stability, provide isolation between different zones (not shown) in the wellbore 30, and enhance the sealing capability of the tubular structure 11 itself.

Figure 4:
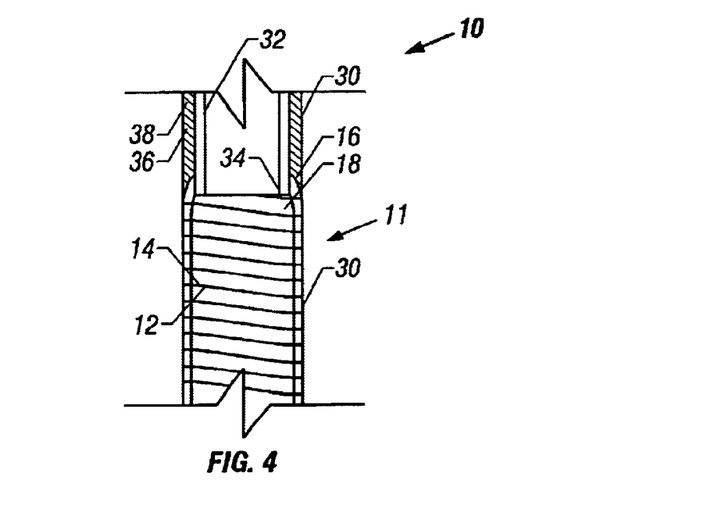
FIG. 4 is a schematic diagram of the tubular structure when used as a well casing with the tubular structure expanded to abut the wellbore wall.

In another embodiment shown in FIG. 4, the tubular structure 11 is again used as a continuation of a casing string 32, however, the internal diameter of the tubular structure 11 is not substantially equal to that of the casing string 32. Instead, the tubular structure 11 is formed directly against the wall of the wellbore 30 without the use of cement or resin 36.

Figure 5:
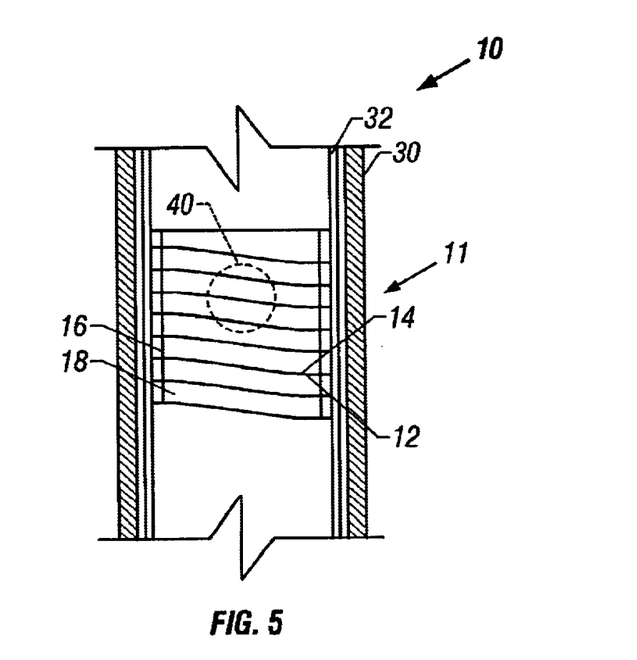
FIG. 5 is a schematic diagram of the tubular structure wherein the tubular structure is used as a casing patch.

Another downhole use of strip 10 is shown in FIG. 5, which illustrates a wellbore 30 and a casing string 32 disposed therein. Casing string 32 includes a damaged area 40 (such as a hole) shown in phantom lines. In this embodiment, strip 10 and the resulting tubular structure 11 is utilized as a mechanism to repair the damaged area 40. The strip 10 is wound on the inside of the casing string 32 so that the resulting tubular structure 11 covers the length of casing string 32 that includes the damaged area 40. The tubular structure 11 is attached and sealed against the interior of the casing 32 by use of suitable means, such as an elastomer which is inserted into the profile of the strip 10 prior to being wound into a tubular structure 11, and thereby prevents any flow of materials through damaged area 40.

The strip 10 may be used to patch other downhole structures. For example, in some embodiments of the invention, the strip 10 may be formed into a tubular structure that is used to patch a production tubing. Other downhole structures may also be patched.

In any of the uses shown herein, the diameter of the tubular structure 11 can change along its length. As shown in FIG. 3, the diameter of tubular structure 11 can decrease from Section A to Section B without losing structural or sealing integrity. To effect this change in diameter, the helix of the tubular structure 11 either gets smaller (if the diameter is decreased) or larger (if the diameter is increased) while the first and second mating portions, 22 and 24, of adjacent windings are engaged. This feature accommodates wellbores that change in diameter down their length and also provides an alternative to the use of multiple diameter casing strings in a single wellbore.

Figure 7:
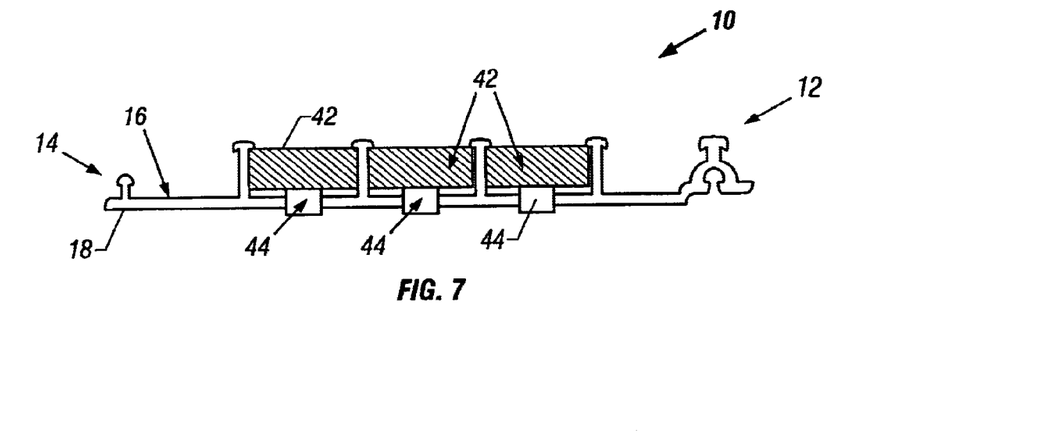
FIG. 7 is a cross-sectional view of an elongated strip used to form a tubular structure that acts as a sand control device.
Figure 8:
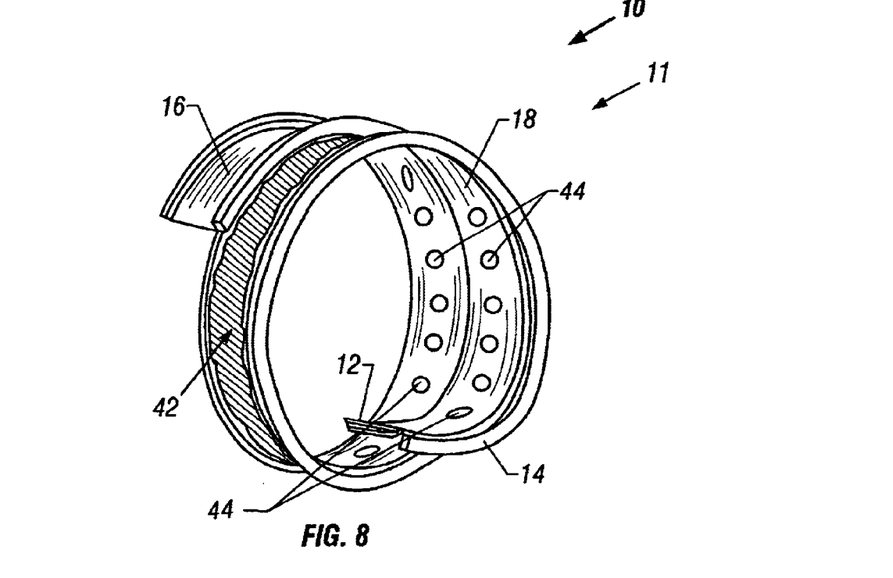
FIG. 8 is an isometric view of the tubular structure wherein the tubular structure is used as a sand control device.

FIGS. 7 and 8 illustrate another downhole use for strip 10. In this embodiment, strip 10 is used as a sand screen and includes a filter media 42 and a plurality of perforations 44 therethrough. Perforations 44 extend through strip 10 from outer surface 16 through inner surface 18 providing fluid communication between the exterior and interior of the resulting tubular structure 11. Filter media 42 is attached to the outer surface 16 of strip 10 and may be constructed from a number of filtering materials, as can be appreciated by one skilled in the art. Deployed within a wellbore, the tubular structure 11 of FIGS. 7 and 8 is attached to a production tubing (not shown) or casing string (not shown) and serves as a sand screen. The tubular structure 11 allows hydrocarbon liquids from a formation to flow through the filter media 42, through the perforations 44, and into the interior of tubular structure 11. The filter media 42 and possibly a gravel pack (not shown) prevent sand particles from also flowing into the tubular structure 11. The strip 10 of FIGS. 7 and 8 can either be sized to have substantially the same internal diameter as the attached production tubing or can be expanded against the wellbore and relevant formation to place a positive stress against the wellbore thereby enhancing wellbore stability.

Similar to the use of strip 10 shown in FIG. 5, the strip 10 of FIGS. 7 and 8 can also be used as a patch to repair damaged areas of sand screens. In this case, the strip 10 is wound along the interior length of the damaged section of the sand screen.

Figure 9:
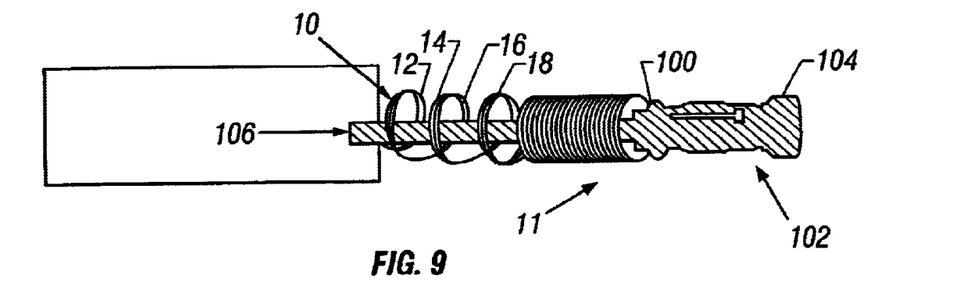
FIG. 9 is a schematic diagram depicting a technique to form a well casing from an elongated strip.

FIG. 9 shows another downhole use of strip 10. FIG. 9 shows a bottom hole assembly 102 that includes a drill 104. Drill 104 is of course utilized to drill wellbores into the earth. Bottom hole assembly 102 is functionally attached to winding machine 100. The winding machine 100 is then attached to coiled tubing or jointed tubing 106 that extends to the surface, as is known in the art. As the drill 104 forms the wellbore, winding machine 100 receives strip 10 and rotates to form strip 10 into tubular structure 11. In this case, tubular structure 11 acts as a well casing. Casing a wellbore shortly after drilling can be important where hole instability may act to jeopardize the success of the drilling operation.

Figure 10:
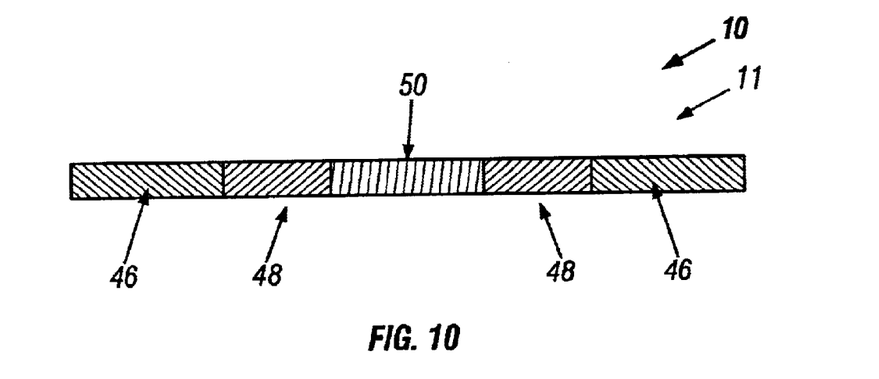
FIG. 10 is a schematic diagram of an elongated strip used to form a tubular structure that acts as a well casing that provides zonal isolation of a formation.

As illustrated in FIGS. 10 and 11, strip 10 can also be constructed so that the resulting tubular structure 11 has specific features at relevant points along its length. For instance, the strip 10 can be configured to be used as a casing that provides zonal isolation and that enables production of hydrocarbons (with the possibility of sand control) at the appropriate location of the well. Such a strip 10 may include the following portions along its elongated length: a solid portion 46, then a sealing portion 48, then a perforated portion 50 (that may include filter media for sand control), then another sealing portion 48, and then another solid portion 46. The resulting tubular structure 11 (FIG. 11) includes a lengthwise solid region 52, sealing region 54, perforated region 56 (that may include filter media for sand control), sealing region 54, and solid region 52. The lengths of each region, 46, 48, and 50, depend on the number of strip 10 windings used for each region. In the illustrated configuration, the tubular structure 11 acts as a well casing that can be cemented in the well. The sealing regions 54 sealingly isolate the perforated region 56, which region is adjacent to a hydrocarbon formation in the wellbore. The perforated region 56 allows production of formation hydrocarbons therethrough (with sand control if a filter media is included) and can also be used to facilitate a stage cementing job or cement squeeze.

The regions shown in FIGS. 10 and 11 are only for purposes of illustration. It is understood that the tubular structure 11 can be customized to include any number of various regions at different locations, depending on the request and desire of the operator.

Figure 13:
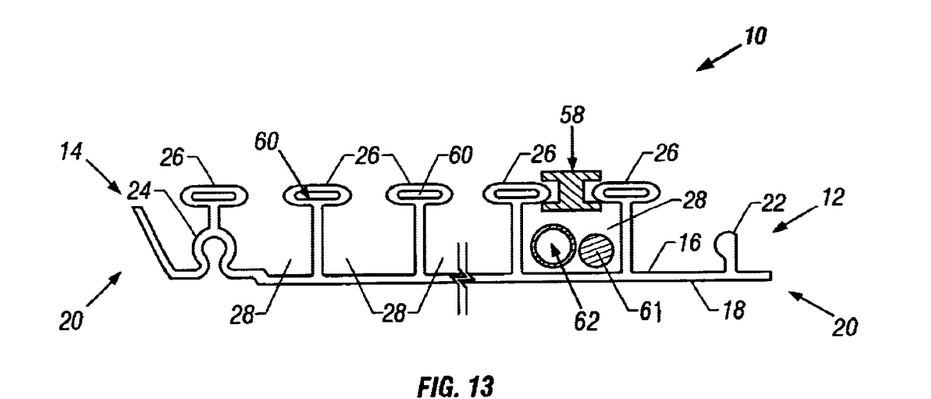
FIG. 13 is a cross-sectional view of an elongated strip that includes a mechanism for providing fluid, electrical or fiber optic communication between two points along the length of the resulting tubular structure.

Yet another downhole use of strip 10 is shown in FIGS. 12 and 13. In this embodiment, strip 10 is utilized to provide electrical, fluid, or fiber-optic communication between two points along the length of the tubular structure 11, for instance from the surface to a specific point in the wellbore. Strip 10 includes a channel cover 58 that encloses the length of at least one channel 28 between the two specified points. Channel cover 58 is preferably attached between the two ribs 26 that define the relevant channel 28. A cable 60 or control line 62 can be disposed within the channel 28, with the channel cover 58 providing appropriate protection to the cable 60 or control line 62. Such cables 60 and control lines 62 can include electrical cables, hydraulic control lines, and fiber optic cables. In addition, intelligent wellbore devices, such as inflow control devices, measuring devices (pressure gauges), or monitoring devices (resistivity arrays), can also be disposed within channel 28.

In a similar embodiment as best shown in FIG. 12, channel cover 58 is sealingly attached to the adjacent ribs 26 thereby forming a seal-tight channel 28. In this embodiment, a gas or liquid, such as a hydraulic fluid or a chemical agent, can be injected or held within the seal-tight channel 28 thereby providing fluid communication between the two points located along the length of tubular structure 11.

FIG. 13 shows a different mechanism which also provides fluid communication between two points along the length of tubular structure 11. In this embodiment, a seal-tight conduit 60 is formed on at least one of the ribs 26 of strip 10. The liquid or gas is then injected or is held within the seal-tight conduit 60.

In addition, the intelligent wellbore devices previously identified may be deployed in seal-tight channel 28 or conduit 60, particularly if such devices require isolation from the downhole environment.

Figure 6:
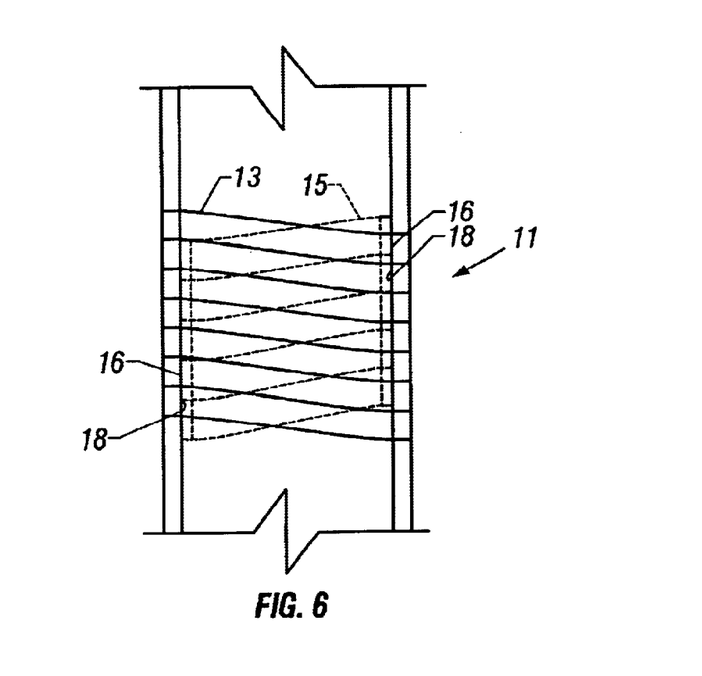
FIG. 6 is a schematic diagram of an embodiment of the tubular structure that comprises an external tubular structure and an internal tubular structure.

For any of the uses described herein, the tubular structure 11 may be formed from an external tubular structure 13 and an internal tubular structure 15, as shown in FIG. 6. First, the external tubular structure 13 is wound and formed as previously disclosed. Next, an internal tubular structure 15 (shown in phantom lines in FIG. 6) is wound internally of external tubular structure 13. Thus, the outer surface 16 of the internal tubular structure 15 abuts (and preferably seals against) the inner surface 18 of the external tubular structure 13. In the preferred embodiment and as shown in FIG. 6, the direction of the helix of external tubular structure 13 is opposite to the direction of the helix of internal tubular structure 15. With this arrangement, the structure and sealing integrity of tubular structure 11 is enhanced and/or reinforced.

Figure 14:
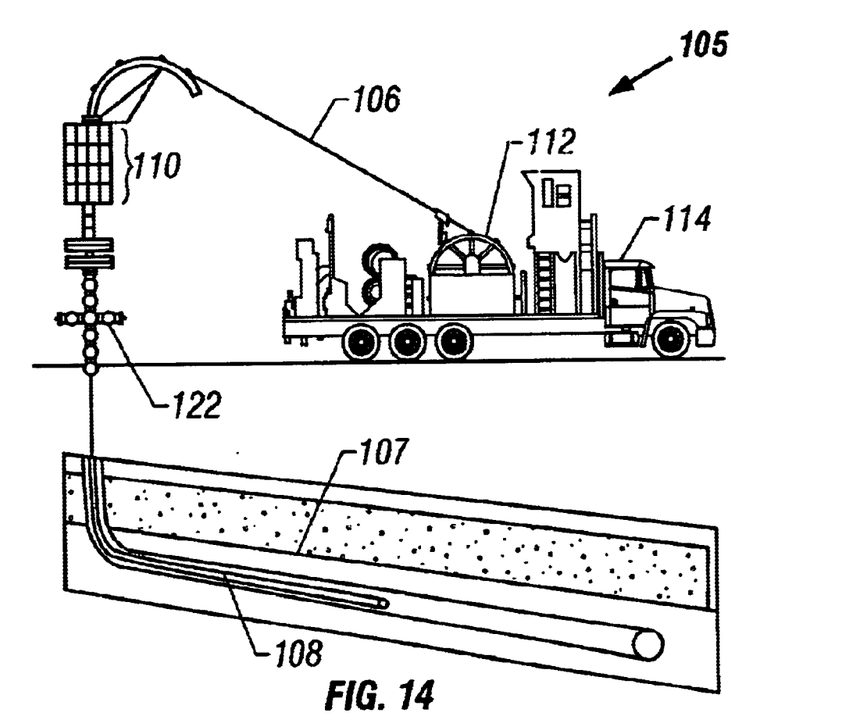
FIGS. 14–17 depict systems to form tubular structures downhole using the elongated strip.

FIG. 14 depicts a system 105 that may be used to deploy the strip 10 downhole inside a wellbore 107. The system 105 includes a truck 114 that contains a spool 112 of tubing 106 that is deployed downhole into the well through a well tree 122. Tubing 106 may comprise drill string, coiled tubing, or jointed tubing. A winding machine assembly 108 is attached to the lower end of the tubing 106 and is used to form a tubular structure inside the wellbore 103 from the strip 10.

Figure 15:
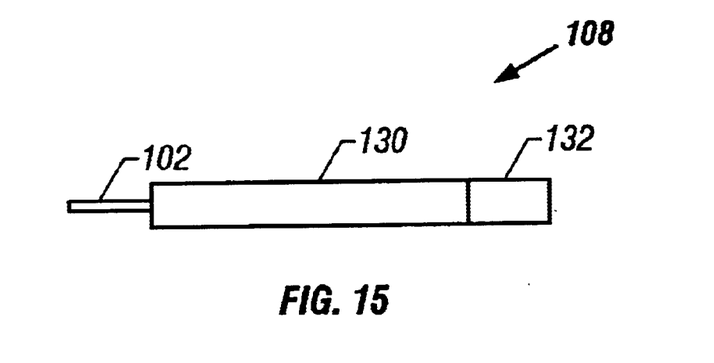

More particularly, referring also to FIG. 15, in some embodiments of the invention, the assembly 108 includes a cartridge 130 to store the strip 10 and a rotating head 132. In this manner, the cartridge 130 feeds the strip 10 to the rotating head 132 that, in turn, includes rollers that guide the strip 10 along a helical path to form the next winding of the tubular structure. As the rotating head 132 retrieves strip 10 from cartridge 130, the guide rollers of the rotating head 132 force the slightly overlapping longitudinal edges of the strip 10 together to cause their mating profiles to engage each other to form the tubular structure. The tubular structure, as formed, propagates away from the rotating head 132.

In some embodiments of the invention, the guide rollers of the rotating head 132 may extend to meet the interior wall of the wellbore 107, thereby causing the outer diameter of the formed tubular structure to be near the interior diameter of the wellbore 107. Therefore, the assembly 108 may be moved (via movement of the tubing 102) to move the rotating head 132 to different positions inside the wellbore 107 to vary the diameter of the tubular structure. Alternatively, command stimuli may be communicated downhole to the rotating head 132 to set the positions of the guide rollers to set the diameter of the tubular structure.

In some embodiments of the invention, the rotating head 132 is driven by the rotation of the tubing 106, a rotation that is introduced by, for example, a rotary drive mechanism 110 that is located at the surface of the well. The tubing 106, in some embodiments of the invention extends through but is not attached to the cartridge 130. Therefore, in these embodiments, the cartridge 130 does not rotate with the rotating head 132. Alternatively, the rotating head 132 may be driven by a downhole motor and not by rotation of the tubing 106. Such an arrangement is advantageous when coiled tubing is used as the tubing 106.

To store the strip 10 downhole, the strip 10 may be wound around a spool of the cartridge 130. The strip 10 may be wound in a direction that is opposed to the rotation of the rotating head 132 so that rotation of the head 132 does not prematurely uncoil the spooled strip 10 inside the cartridge 130. Guide rollers of the rotating head 132 remove the strip 10 from the cartridge 130 to form the tubular structure as needed.

Alternatively, in some embodiments of the invention, the cartridge 130 may be constructed to rotate with the rotating head 132. For example, the cartridge 130 may be attached to the tubing 106. Thus, due to this arrangement, the strip 10 does not need to be wound in a manner to counter the rotation of the rotating head 132.

Figure 16:
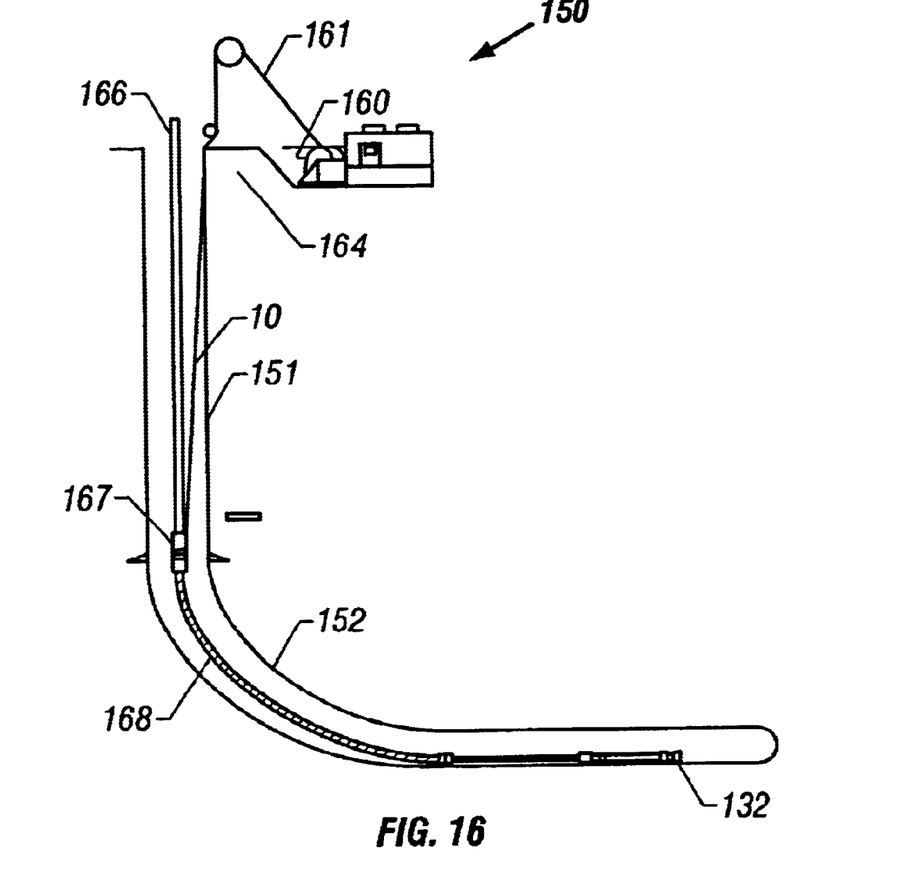

FIG. 16 depicts another system 150 to deploy the strip 10 downhole and form the tubular structure downhole. In this embodiment, the strip 10 is deployed in its linear configuration into an annulus of the well from a spool 160 that is located at the surface of the well. The annulus is formed in the annular region between a tubing 166 (jointed tubing, coiled tubing, or drill string) that extends down into a wellbore and the interior wall of the wellbore.

As depicted in FIG. 16, a portion of the wellbore is cased 151, and another portion 152 is to be lined with a tubular structure formed from the strip 10. The lower end of the tubing 166 is attached to a side entry sub 167 that couples the tubing 166 to a tubular section 168 of pipe (a jointed or coiled tubing, for example) in which the strip 10 is allowed to coil. In this manner, the side entry sub 167 provides a side entry port to the interior passageway of the section 168 through which the strip 10 is threaded. Inside the section 168, the strip 10 coils in response to the rotation of the tubing 166 (and tubing section 168), a rotation that drives the rotating head 132. The end of the strip 10 is fed to the rotating head 132 for purposes of forming the tubular structure. Instead of being driven by the rotation of the tubing 166, the rotating head 132 may be driven by a downhole motor (without rotation of the tubing). Such an arrangement is advantageous when coiled tubing is used as the tubing 166.

The rotating head 132 is attached to a length of pipe 168 and deployed in to the well. The length of section 168 is such to contain the strip required to line a defined length of the wellbore. For instance, 8,000 feet of strip may be required to line 1,000 of wellbore. Therefore, in this example the length of 168 would be 8,000 feet. Once section 168 is run into the wellbore it is temporarily hung off at the surface. Then, 8000 feet of the strip is fed into section 168 until it engages and latches into the winding head 132. It may be desirable to put a twist into the strip 10 while feeding it into section 168. There would be one twist for every spiral winding downhole. Doing this prevents the need for the strip to rotate inside section 168 while winding the pipe downhole. Once the required length of strip is feed into section 168, a retaining cable 161 is attached to the upper end of the strip. Alternatively, the strip 10 itself may extend to the surface and provide the support instead of the retaining cable 161. The side entry sub 167 is attached to section 168 with the retaining cable feed from the end of the strip to outside of the side entry sub 167. Additional lengths of pipe and cable are fed into the wellbore until the rotating head 132 reaches the desired depth at which point the winding of the pipe downhole begins.

Figure 17:
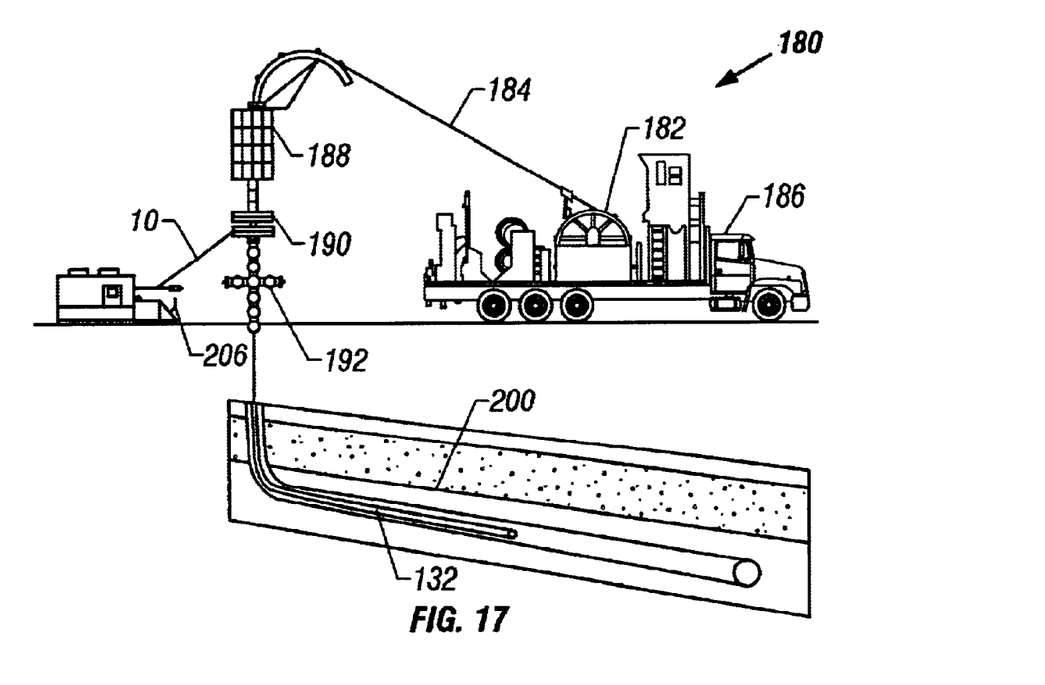
Figure 18:
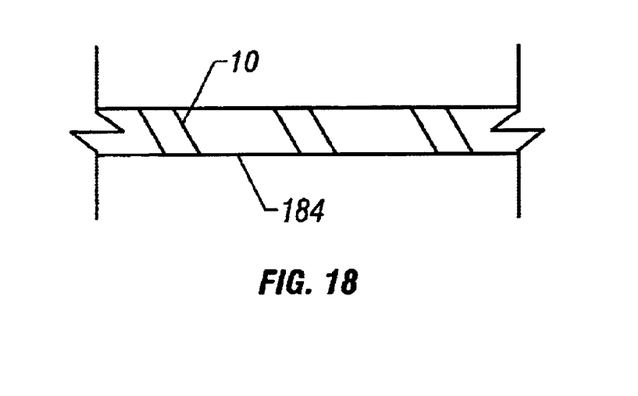
FIG. 18 is an illustration of a tubing of the system of FIG. 17.

FIG. 17 depicts yet another system 180 for deploying the strip 10. At the surface of the well, tubing 184 (jointed tubing, coiled tubing, or drill pipe) is unrolled from a tubing spool 182 (located on a truck 186) and may be fed through a rotary drive mechanism 188 (that is capable of turning the tubing 184) and through a well tree 192 into the well. At the surface of the well, the tubing 184 also passes through a mechanism 190 that receives the strip 10 from a coil 206 and wraps the strip around the tubing 184. Thus, as depicted in FIG. 18, the mechanism 190 spirally wraps the strip 10 around the tubing 184. Still referring to FIG. 17, the tubing 184 with the wrapped strip 10 is deployed downhole. The lower end of the tubing 184 is connected to the rotating head 132 that winds the strip 10 off of the tubing 184 and spiral wraps the strip 10 to form a tubular structure downhole in a particular section 200 of the wellbore. Instead of being driven by the rotation of the tubing 184, the rotating head 132 may be driven by a downhole motor (without rotation of the tubing). Such an arrangement is advantageous when coiled tubing is used as the tubing 184.

Figure 19A:
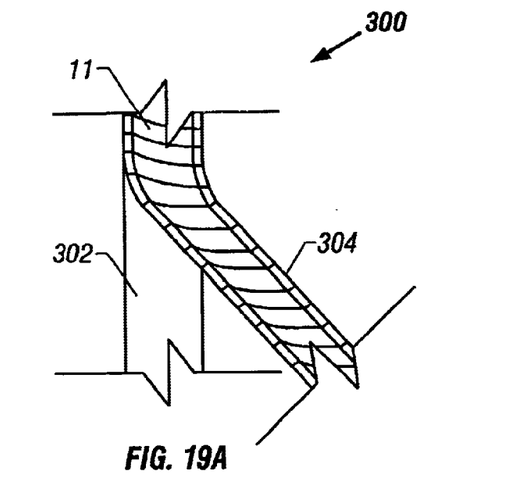
FIGS. 19 and 20 are schematic diagrams of the strip described herein used in multilateral wellbores.
Figure 19B:
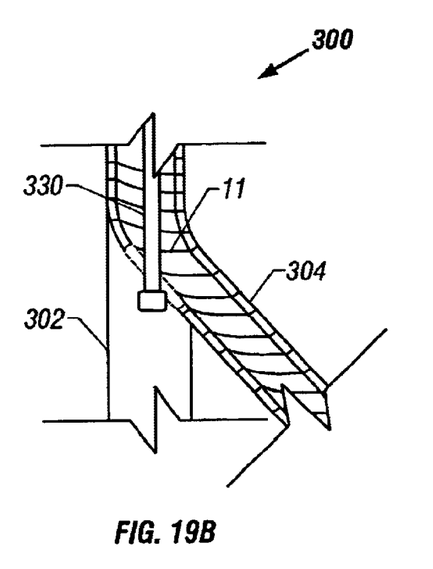
Figure 19C:
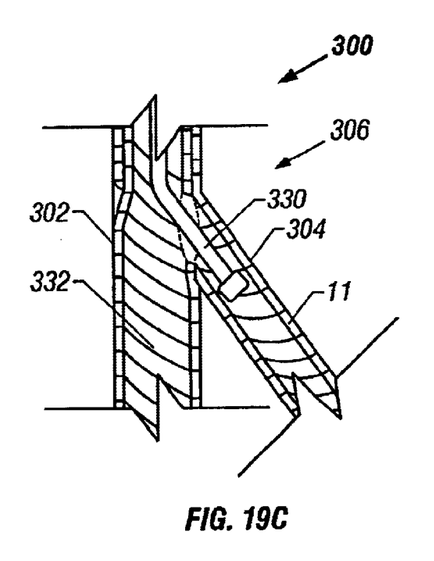
Figure 20A:
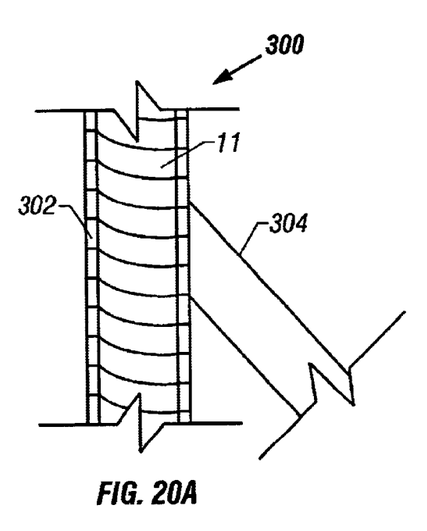
Figure 20B:
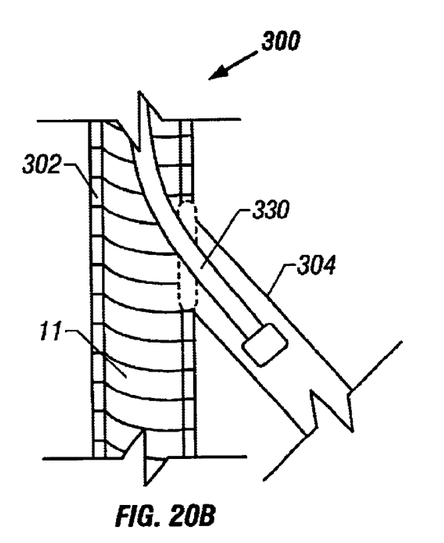
Figure 20C:
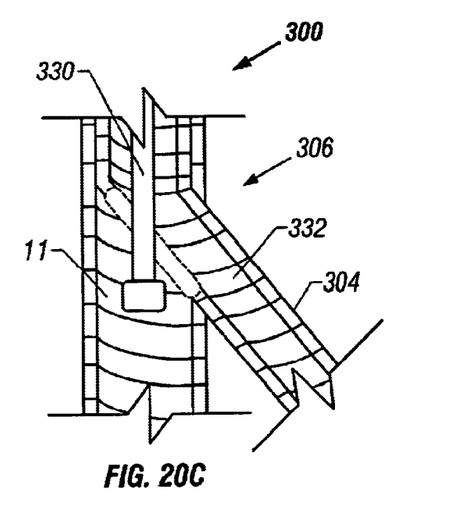

FIGS. 19–20 show another downhole use of strip 10. FIGS. 19 and 20 show a subterranean well 300 that includes a main wellbore 302 and a lateral wellbore 304. The lateral wellbore 304 extends from the main wellbore 302. The tubular structure 11 that results from the winding of strip 10 may be used to either line or case both the main wellbore 302 and the lateral wellbore 304 so as to form a junction 306 in the process (see FIGS. 19C and 20C) or to line or case the lateral wellbore 304 while maintaining flow through the main wellbore 302 (see FIG. 19B). Due to the attachment mechanisms of the tubular structure 11, a resulting junction 306 is mechanically stable and may also have pressure integrity. The tubular structure 11 may be deployed directly on the walls of the wellbores 302 and 304 (without the use of cement between the tubular structures and the wellbore walls) or may be cemented in place to such walls, as previously discussed.

As shown in FIGS. 19A–C, the lateral wellbore 304 may be lined or cased first. The strip 10 can be guided into the lateral wellbore 304 either by use of a steerable guide roller (not shown) or a whipstock (not shown) placed underneath the relevant lateral wellbore 304 (see FIG. 19A). Once the tubular structure 11 is formed in the lateral wellbore 304, a cutting tool or mill 330 is deployed (see FIG. 19B) to cut a passageway in the tubular structure 11 to provide communication through the main wellbore 302. As an optional additional step as shown in FIG. 19C, a second tubular structure 332 may be deployed within and against the tubular structure 11 and through the passageway cut through tubular structure 11 to line or case the main wellbore 302 including the area below the lateral wellbore 304. An additional passageway would then need to be cut through second tubular structure 332 using a cutting tool or mill 330 in order to re-establish communication from the lateral wellbore 304 to the main wellbore 302.

FIGS. 20A–20B show the main wellbore 302 being lined or cased first. After the tubular structure 11 is deployed in main wellbore 302, a cutting tool or mill 330 is deployed (see FIG. 20B) to cut a passageway in the tubular structure 11 to provide communication between the lateral wellbore 304 and the main wellbore 302. Next, as shown in FIG. 20C, a second tubular structure 332 is deployed within and against the tubular structure 11 and through the passageway cut through tubular structure 11 to line or case the lateral wellbore 304. The strip 10 can be guided into the lateral wellbore 304 either by use of a steerable guide roller (not shown) or a whipstock (not shown) placed underneath the relevant lateral wellbore 304. An additional passageway is then cut through second tubular structure 332 using a cutting tool or mill 330 in order to re-establish communication through main wellbore 302.

For the techniques used in either FIG. 19 or 20, the second tubular structure 332 may be deployed concurrently with the cutting of the relevant passageways, as generally described with respect to FIG. 9.

It is understood that the invention is not limited to the exact details of construction, operation, exact materials or embodiments shown and described, as obvious modifications and equivalents will be apparent to one skilled in the art having the benefit of this disclosure. Accordingly, the invention is therefore to be limited only by the scope of the appended claims.

What is claimed is:

1. A system usable in a subterranean well, comprising:
   a spirally wound strip comprising interlocking features to form a tubular structure and a fluid seal between adjacent edges of the strip,
   wherein the tubular structure is deployed downhole in the subterranean well.

2. The system of claim 1, further comprising:
   a downhole structure in the well to which the tubular structure is mounted.

3. The system of claim 2, wherein the downhole structure comprises a production tubing.

4. The system of claim 2, wherein the downhole structure comprises a casing.

5. The system of claim 2, wherein the downhole structure comprises another tubular structure pressed against the first tubular structure.

6. The system of claim 5, wherein a helical orientation of said another tubular structure is in an opposite direction from a helical orientation of the first tubular structure.

7. The system of claim 1, wherein the strip comprises:
   a first longitudinal edge,
   a second longitudinal edge,
   a first profile near the first longitudinal edge, and
   a second profile near the second longitudinal edge such that the first and second profiles mate in adjacent windings of the tubular structure.

8. The system of claim 1, wherein the tubular structure is used as a casing string in the wellbore.

9. The system of claim 1, wherein the tubular structure comprises a perforated portion and a sealing portion at either side of the perforated portion to isolate the perforated region from the remainder of a wellbore.

10. The system of claim 9, wherein hydrocarbons flow from a downhole formation of the well through the perforated region and into the interior of the tubular structure.

11. The system of claim 1, wherein the tubular structure is used as a patch.

12. The system of claim 1, wherein the tubular structure has a cross-sectional diameter that changes along its length.

13. The system of claim 1, wherein the tubular structure is expanded against a wellbore wall.

14. The system of claim 1, wherein the tubular structure comprises perforations to communicate well fluid into an internal passageway of the tubular structure.

15. The system of claim 14, wherein the tubular structure further comprises filter media to filter particulates contained in the well fluid.

16. The system of claim 15, wherein the particulates comprise sand particles.

17. The system of claim 1, wherein the strip includes an outer surface and ribs extending from the outer surface defining a communication channel between two points along the length of the tubular structure.

18. The system of claim 17, wherein the strip comprises a channel cover attached to the ribs and extending over the channel.

19. The system of claim 18, wherein the channel cover is sealingly attached to the ribs.

20. The system of claim 19, wherein fluid is deployed in the channel.

21. The system of claim 17, further comprising a cable or control line disposed within the channel.

22. The system of claim 17, further comprising an intelligent wellbore device disposed within the channel.

23. The system of claim 1, wherein the strip includes an outer surface, the system further comprising:

a plurality of ribs extending from the outer surface and at least one of the ribs defining a conduit along its length.

24. The system of claim 1, wherein the tubular structure is formed during drilling of a wellbore.

25. The system of claim 1, wherein adjacent windings of the strip are locked together to prevent the diameter of the tubular structure from changing.

26. A method usable in a subterranean well, comprising:

providing an elongated strip within the subterranean well;

engaging interlocking features of the strip to form a tubular structure from the elongated strip;

forming a fluid seal between adjacent edges of the strip; and using the tubular structure to perform a downhole function in the subterranean well.

27. The method of claim 26, wherein the forming step occurs within the subterranean well.

28. The method of claim 27, wherein the forming step comprises:

attaching a first profile located near a first longitudinal edge of the strip to a second profile located near a second longitudinal edge of the strip to form the tubular structure.

29. The method of claim 27, further comprising:

expanding the tubular structure against a wellbore.

30. The method of claim 26, further comprising:

attaching the tubular structure to a production tubing.

31. The method of claim 26, further comprising:

attaching the tubular structure to a casing.

32. The method of claim 26, further comprising:

attaching the tubular structure to another spirally wound tubular structure.

33. The method of claim 32, wherein a helical orientation of said another spirally wound tubular structure is in a direction opposite from a helical orientation of the first tubular structure.

34. The method of claim 26, further comprising:

using the tubular structure as a casing in the well.

35. The method of claim 26, further comprising:

using the tubular structure as a patch for tubing.

36. The method of claim 28, further comprising:

forming perforations in the tubular structure; and forming sealing regions on each side of the perforations to isolate the perforations from the remainder of a wellbore.

37. The method of claim 35, further comprising:

receiving well fluid through the perforations.

38. The method of claim 26, further comprising changing the cross-sectional diameter of the tubular structure along its length.

39. The method of claim 26, further comprising adding filtered media to the tubular structure to filter particulates from well fluid flowing through the tubular structure.

40. The method of claim 39, wherein the particulates comprise sand particles.

41. The method of claim 26, further comprising:

defining a communication channel along an exterior surface of the tubular structure.

42. The method of claim 41, further comprising:

sealing off the communication channel.

43. The method of claim 41, further comprising:

deploying fluid in the communication channel.

44. The method of claim 41, further comprising:

disposing a cable or control line within the channel.

45. The method of claim 41, further comprising:

disposing an intelligent wellbore device within the channel.

46. The method of claim 41, wherein the forming comprises:

forming the tubular structure during the drilling of a wellbore.

47. The method of claim 26, further comprising:

locking adjacent windings of the strip together to prevent the diameter of the tubular structure from changing.

48. A well conduit comprising:

a spirally wound strip, wherein the strip is positioned within a subterranean well and forms a sealed wall of a self-supporting tubular structure, the sealed wall preventing fluid communication between an interior passageway of the tubular structure and an exterior of the tubular structure.

49. The well conduit of claim 48, wherein the strip comprises at least part of a casing string.

50. The well conduit of claim 48, wherein the strip comprises at least part of a production tubing.

51. The well conduit of claim 48, wherein the strip comprises at least part of a screen.

52. The well conduit of claim 48, wherein the strip comprises a patch for a downhole structure.

* * * * *